(12) United States Patent
Reiland et al.

(10) Patent No.: US 8,525,460 B2
(45) Date of Patent: Sep. 3, 2013

(54) ARCHITECTURE FOR ROBUST FORCE AND IMPEDANCE CONTROL OF SERIES ELASTIC ACTUATORS

(75) Inventors: Matthew J. Reiland, Oxford, MI (US); Brian Hargrave, Dickenson, TX (US); Robert Platt, Houston, TX (US); Muhammad E. Abdallah, Houston, TX (US); Frank Noble Permenter, Webster, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 755 days.

(21) Appl. No.: 12/698,832

(22) Filed: Feb. 2, 2010

(65) Prior Publication Data

US 2011/0190934 A1 Aug. 4, 2011

(51) Int. Cl.
*H02P 7/00* (2006.01)

(52) U.S. Cl.
USPC ............... 318/432; 74/473.12; 74/490.01; 74/490.03; 74/490.05; 267/69; 267/277; 267/278; 267/279; 318/560; 318/625; 318/630; 318/652; 318/400.14

(58) Field of Classification Search
USPC ............... 318/568.11, 568.12, 560, 623, 652, 318/661, 689, 432, 400.4, 721, 437, 434, 318/400.07, 400.14, 400.15, 467, 433, 489, 318/554, 625, 630, 631, 632; 74/337, 411.5, 74/473.12, 490.01, 490.03, 490.05, 495, 74/573.12, 592; 83/17–18; 211/105.5; 251/80, 251/334; 267/69, 277, 278, 279, 140.11; 901/20, 23, 35, 47
See application file for complete search history.

(56) References Cited

U.S. PATENT DOCUMENTS 4,860,215 A   8/1989 Seraji
(Continued)

FOREIGN PATENT DOCUMENTS

| FR | 2632561 (A1) | 12/1989 |
| JP | 2580502 (B2) | 2/1997 |
| JP | 2005-349555 (A) | 12/2005 |

OTHER PUBLICATIONS

Kong, K., Bae, J. and Tamozuka, M., "Control of Rotary Series Elastic Actuator for Ideal Force-Mode Actuation in Human-Robot Interaction Applications", IEEE/ASME Transactions on Mechatronics, , Feb. 2009, pp. 105-118, vol. 14., No. 1.

*Primary Examiner* — Antony M Paul
(74) *Attorney, Agent, or Firm* — John A. Miller; Miller IP Group, PLC

(57) ABSTRACT

An SEA architecture for controlling the torque applied by an SEA that has particular application for controlling the position of a robot link. The SEA architecture includes a motor coupled to one end of an elastic spring and a load coupled to an opposite end of the elastic spring, where the motor drives the load through the spring. The orientation of the shaft of the motor and the load are measured by position sensors. Position signals from the position sensors are sent to an embedded processor that determines the orientation of the load relative to the motor shaft to determine the torque on the spring. The embedded processor receives reference torque signals from a remote controller, and the embedded processor operates a high-speed servo loop about the desired joint torque. The remote controller determines the desired joint torque based on higher order objectives by their impedance or positioning objectives.

18 Claims, 2 Drawing Sheets

(56) References Cited

U.S. PATENT DOCUMENTS

| | | | |
|---|---|---|---|
| 4,974,210 A | 11/1990 | Lee | |
| 5,103,404 A | 4/1992 | McIntosh | |
| 5,499,320 A | 3/1996 | Backes et al. | |
| 5,910,720 A * | 6/1999 | Williamson et al. | 318/623 |
| 6,033,415 A | 3/2000 | Mittelstadt | |
| 6,081,754 A | 6/2000 | Schlemmer | |
| 6,226,566 B1 | 5/2001 | Funda et al. | |
| 6,393,340 B2 | 5/2002 | Funda et al. | |
| 7,090,200 B2 * | 8/2006 | Morse et al. | 254/332 |
| 8,047,766 B2 * | 11/2011 | Goll | 415/55.1 |
| 2006/0048364 A1 | 3/2006 | Zhang et al. | |
| 2007/0255454 A1 | 11/2007 | Dariush | |
| 2008/0046122 A1 * | 2/2008 | Manzo et al. | 700/245 |
| 2008/0140257 A1 | 6/2008 | Sato et al. | |
| 2009/0024142 A1 * | 1/2009 | Ruiz Morales | 606/130 |
| 2011/0257764 A1 * | 10/2011 | Herr et al. | 623/24 |

* cited by examiner

ARCHITECTURE FOR ROBUST FORCE AND IMPEDANCE CONTROL OF SERIES ELASTIC ACTUATORS

STATEMENT REGARDING FEDERALLY SPONSORED RESEARCH OR DEVELOPMENT

The invention described herein may be manufactured and used by or for the U.S. Government for U.S. Government (i.e., non-commercial) purposes without the payment of royalties thereon or therefore.

BACKGROUND OF THE INVENTION

1. Field of the Invention

This invention relates generally to an architecture for controlling the impedance and force provided by a series elastic actuator and, more particularly, to an architecture for controlling the impedance and force provided by a series electric actuator that includes a position sensor for determining the position of a motor shaft at one end of a spring, a position sensor for determining the position of a load at an opposite end of the spring, and an embedded high-speed processor that receives the measurement signals from the sensors and controls the orientation of the motor shaft to provide torque on the spring to control the orientation of the load, where the embedded processor receives torque reference commands from a remote controller.

2. Discussion of the Related Art

A series elastic actuator (SEA) employs a spring or other elastic element between a motor and the output of the actuator to transmit motion of the motor to motion of the actuator output. The deflection of the spring is typically used to measure the torque that is applied to the actuator output. SEAs are typically used in robots where the actuator is used to move the robot joints and links.

There are two main benefits to using SEAs. First, the relatively high compliance of the elastic element with respect to the motor transmission decouples the actuator output from the motor at high frequencies. This reduces the high-frequency passive inertia of the robot link, even when the motor and motor transmission have a large inertia. As a result, the lower high-frequency passive inertia makes SEA-driven robots safer around humans.

A second advantage of SEAs is an improved ability to control forces applied by the actuator and, therefore, to control actuator impedance. When the elastic element has a relatively high compliance with respect to the environment, then the sensitivity of the actuator force to small changes in motor position is reduced. As a result, it is easier to control applied actuator force using a position-controlled motor. Also, when the spring constant of the elastic element is known precisely, it is possible to measure actuator output forces by measuring spring deflection. This can eliminate the need for direct measurement of applied forces.

Although most mechanical realizations of SEAs are similar, there are several different approaches to SEA control. Most previous work on SEA control focuses on methods for controlling the SEA output force. One of the earliest SEA control strategies is essentially a PID (proportional-integral-derivative) controller on force error. Applied force is measured using a strain gauge mounted on the elastic element. This is compared to a force reference and the difference on this error.

Another approach to SEA control uses an internal motor position or velocity controller that is cascaded with the force controller. The force controller calculates a force error by differencing applied force and the force reference. A PD controller acts upon the force error and calculates a desired motor velocity. This velocity reference is input to the motor velocity controller. The motor velocity controller is implemented as a PID controller with a differentiator in its feedback path.

SUMMARY OF THE INVENTION

In accordance with the teachings of the present invention, an SEA architecture is disclosed for controlling the torque applied by an SEA without calculating a force error or directly measuring an elastic SEA element with a strain gauge, where the architecture has particular application for controlling the position of a robot link. The SEA architecture includes a motor coupled to one end of an elastic spring and a load coupled to an opposite end of the elastic spring, where the motor drives the load through the spring. The orientation of the shaft of the motor is measured by a first position sensor and the orientation of the load is measured by a second position sensor. Position signals from the position sensors are sent to an embedded processor that determines the orientation of the load relative to the motor shaft to determine the torque on the spring. The embedded processor receives reference torque signals from a remote controller, and the embedded processor operates a high-speed servo loop about the desired joint torque. The remote controller determines the desired joint torque based on higher order objectives by their impedance or positioning objectives. The remote controller provides the torque commands to several SEA architectures in the robot.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an SEA architecture for providing robust force and impedance control for a series elastic actuator is merely exemplary in nature, and is in no way intended to limit the invention or its applications or uses.

The present invention relates to an n joint manipulator or robot where each joint is actuated by a series elastic actuator (SEA). An SEA is a device that exploits a built-in compliance to sense and control force through the actuator. A typical SEA is composed of a traditional actuator with a low compliance in series (or in-line) with a high compliance element, such as a spring. Each SEA includes an electric motor in series with a harmonic drive that has a large gear reduction. The elastic element is a torsional spring with low stiction and a large linear range that connects the output of the harmonic drive to the SEA output and the robot link. High resolution position sensors are mounted on the harmonic drive output and the SEA output. Motor control is provided locally using a high speed embedded microcontroller with an integral motor controller to control the joint output torque. The embedded microcontroller may run at a very high rate, such as 10 kHz. In addition to the embedded microcontroller, a remote controller is located off-board and runs at a lower rate for calculating the reference force and or impedance. The two controllers may be connected to each other through a high speed communications bus.

Figure 1:
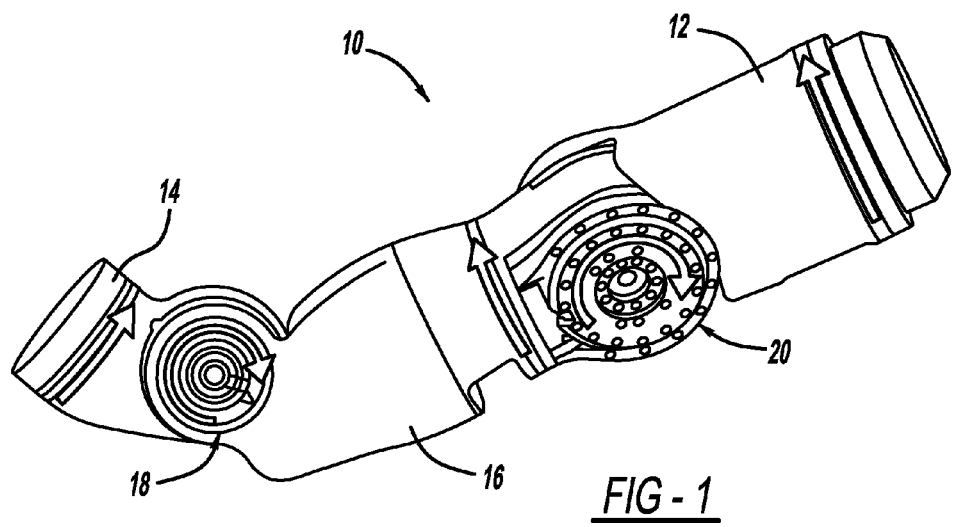
FIG. 1 is a perspective view of a robotic arm including SEAs.

FIG. 1 is a perspective view of a robotic arm 10 including an upper arm link 12, a middle arm link 16 and a lower arm link 14, where the lower arm link 14 and the middle arm link 16 are connected by a joint 18 and the middle arm link 16 and the upper arm link are connected by a joint 20. each of the joints 18 and 20 include a series elastic actuator to provide the torque control between the two adjacent links in a manner well understood by those skilled in the art. In this embodiment, the series elastic actuators are rotary actuators including a rotary spring. The robotic arm includes several rotational degrees of freedom for various robot arm designs, as would be well understood to those skilled in the art.

Figure 2:
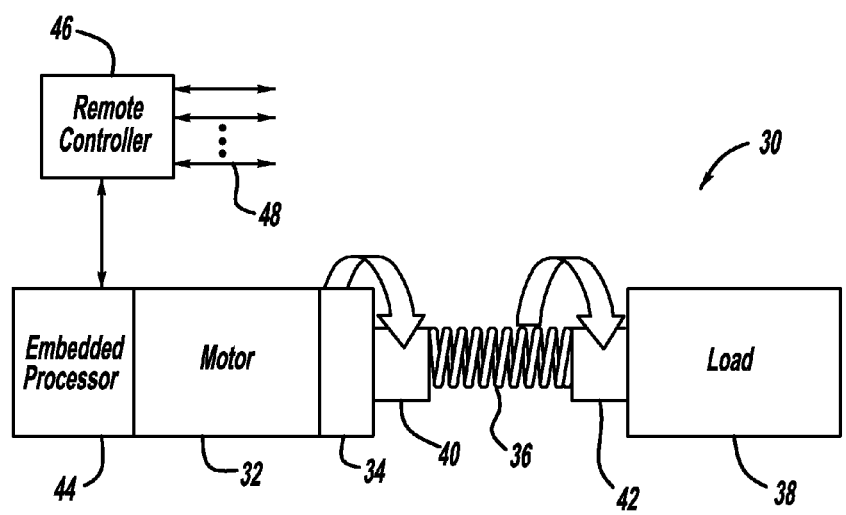
FIG. 2 is a block diagram of an SEA architecture for controlling a series elastic actuator.

FIG. 2 is a plan view of an SEA architecture 30 including a motor 32 having a large reduction gear box 34. The motor 32 is coupled to one end of a spring 36 and drives an inertial load 38 coupled to an opposite end of the spring 36. The motor 32 includes a motor shaft (not shown) that rotates the spring 16 to provide an impedance and torque to the load 38. The load 38 can be any suitable load, such as a robotic link, including the arm links 12, 14 and 16. The orientation of the shaft of the motor 32 is measured by a high resolution position sensor 40 and the orientation of the load 38 is measured by a high resolution position sensor 42. The signals from the sensors 40 and 42 provide a measurement of how much the spring 36 is deflected or rotated. If the spring rate is known and both the input and output positions are measured, then the torque on the spring 36 applied to the load 38 can be determined. Thus, for an applied torque measurement, a feedback torque loop may be realized such that a desired torque is generated through the spring 36.

The architecture 30 includes an embedded processor 44 shown here coupled to the motor 32, but able to be provided at any local position relative to the SEA. The embedded processor 44 receives the position signals from the position sensors 40 and 42 and, based on the orientation of the motor shaft and the load 38 in combination with the spring rate, the processor 44 calculates the torque on the spring 36, and thus the impedance, applied to the load 38. The embedded processor 44 receives a reference force or torque signal from a low speed remote controller 46, through a communications bus 48, that provides the desired torque on the spring 36 or position for the load 38.

The reference torque provided by the remote controller 46 provides a torque set-point for control of the motor shaft provided by the embedded processor 44. This torque may be computed in the remote controller 46 based on a desired position, torque or impedance behavior for the load 38. The embedded processor 44 applies a high speed servo loop to regulate the torque value applied by the actuator. The servo loop can involve a position controller on the motor 32 that calculates the desired motor position based on the desired torque, the spring stiffness constant and the link position. This torque servo loop operates at the much higher rate of the embedded processor 44 without the communication delays of the bus 48, thus providing a much greater performance and stability for the torque control. Use of the absolute position sensors 40 and 42, rather than incremental or relative sensors, allows for an absolute measure of the torque applied without an activation routine.

Figure 3:
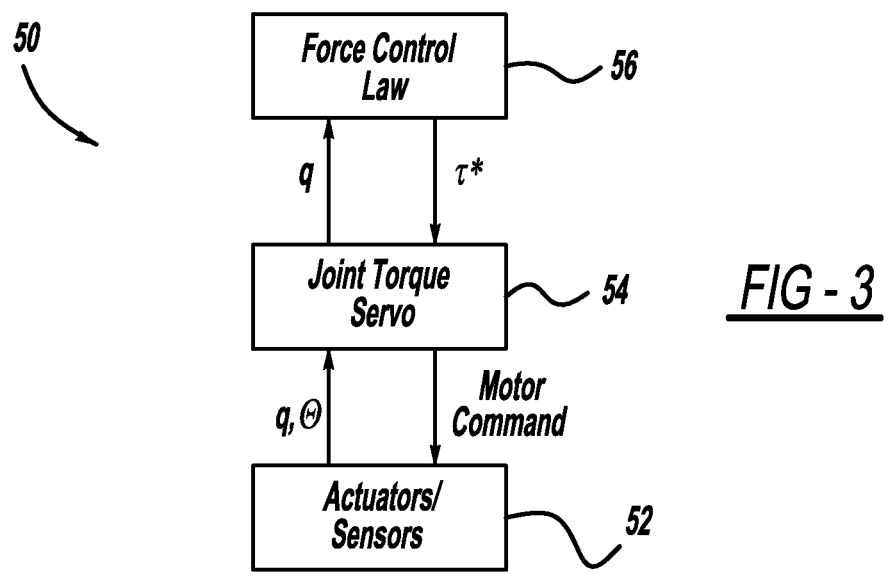
FIG. 3 is a schematic block diagram of a control architecture for the SEA architecture shown in FIG. 2.

FIG. 3 is a schematic block diagram of a control architecture 50 for the SEA architecture 30 shown in FIG. 2. The control architecture 50 includes actuators and sensors at box 52 that receive a motor command signal for the actuators from a joint torque servo 54 and provides positional signals from the sensors 40 and 42 to the joint torque servo 54. The position signals include a position signal θ from the sensor 40 for the motor shaft and a position signal q from the sensor 42 for the orientation of the load 38. The joint torque servo 54 provides the position signal q to a force control law box 56 which provides a reference torque signal τ* to the servo 54. The joint torque servo 54 represents the multiple embedded processors and the force control law box 56 represents the remote controller 46.

The remote controller 46 can control many embedded processors in the robotic system over the high speed communications bus 48, which would also individually be coupled to another embedded controller controlling an SEA at another robotic joint.

The advantages of the proposed architecture for providing impedance control of a series elastic actuator over the existing impedance control approach can be summarized as follows. The proposed architecture of controlling the torque locally at the joint with a high speed microcontroller while calculating the command torque off-board at a lower rate provides an increased level of sensitivity and stability over prior approaches. Further, the use of position sensors on the EA to compute the applied torque provides a higher signal-to-noise ratio than approaches that utilize strain sensors.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A series elastic actuator architecture for providing force control for a series elastic actuator that actuates a load, said architecture comprising:
   a spring coupled to the load;
   a motor including a motor shaft and a gear box, said motor shaft being coupled to the spring;
   a first position sensor provided at an output of the gear box of the motor, said first sensor measuring the orientation of the motor shaft;
   a second position sensor provided at an opposite end of the spring and measuring the orientation of the load;
   an embedded processor provided proximate the motor and receiving sensor position signals from the first and second sensors, said embedded processor calculating the actual torque of the spring based on the spring rate and the difference between the orientation of the motor shaft and the orientation of the load; and
   a remote controller providing a reference torque signal to the embedded processor, said embedded processor determining the difference between the reference torque and the actual torque on the spring and controlling the position of the motor shaft so that the reference torque and the actual torque are the same.

2. The architecture according to claim 1 wherein the embedded processor operates at a higher speed than the remote controller.

3. The architecture according to claim 2 where the embedded processor operates at a speed of about 10 kHz.

4. The architecture according to claim 1 wherein the series elastic actuator is a rotary series elastic actuator.

5. The architecture according to claim 1 wherein the load is a robot link.

6. The architecture according to claim 5 wherein the robot link is an arm piece of a robot.

7. The architecture according to claim 1 wherein the remote controller provides a torque reference signal to a plurality of embedded controllers controlling a plurality of series elastic actuators.

8. The architecture according to claim 1 wherein the first and second position sensors are absolute position sensors.

9. The architecture according to claim 1 wherein the gear box is a large reduction gear box.

10. The architecture according to claim 1 wherein a servo loop within the embedded processor controls the position of an actuator according to a relation between position and the torque in the spring.

11. A series elastic actuator architecture for providing force control for a series elastic actuator that actuates a robotic link, said architecture comprising:
 a rotary spring coupled to the robotic link;
 a motor including a motor shaft and a gear box, said motor shaft being coupled to the spring;
 a first position sensor provided at an output of the gear box of the motor and measuring the absolute orientation of the motor shaft;
 a second position sensor provided at a location where the spring is coupled to the robotic link and measuring the absolute orientation of the robotic link;
 an embedded processor provided proximate the motor and receiving sensor position signals from the first and second sensors, said embedded processor calculating the actual torque on the spring based on the difference between the first position sensor and the second position sensor; and
 a remote controller providing a reference torque signal to the embedded processor, said embedded processor determining the difference between the reference torque and the actual torque on the spring and controlling the position of the motor shaft so that the reference torque and the actual torque are the same, said embedded processor operating at a higher speed than the remote controller.

12. The architecture according to claim 11 wherein a servo loop within the embedded processor controls the position of an actuator according to a relation between position and the torque in the spring.

13. The architecture according to claim 11 wherein a servo loop within the embedded processor controls the position of an actuator according to a relation between position and the torque in the spring.

14. The architecture according to claim 11 where the embedded processor operates at a speed of about 10 kHz.

15. The architecture according to claim 11 wherein the robot link is an arm piece of a robot.

16. The architecture according to claim 11 wherein the remote controller provides a torque reference signal to a plurality of embedded controllers controlling a plurality of series elastic actuators.

17. The architecture according to claim 11 wherein the gear box is a large reduction gear box.

18. A series elastic actuator architecture for providing force control for a series elastic actuator that actuates a load, said architecture comprising:
 a set of series elastic actuator joints, where the set contains two or more series elastic actuator joints and where each series elastic actuator joint includes:
  a spring coupled to the load;
  a motor including a motor shaft and a large reduction gear box, said motor shaft being coupled to the spring;
  a first absolute position sensor provided at an output of the gear box of the motor, said first sensor measuring the orientation of the motor shaft;
  a second absolute position sensor provided at an opposite end of the spring and measuring the orientation of the load; and
  an embedded processor provided proximate the motor and receiving sensor position signals from the first and second sensors, said embedded processor calculating the actual torque of the spring based on the orientation of the motor shaft and the load and the spring rate;
 a high speed communication bus; and
 a remote controller that communicates with the set of series elastic actuator joints through the high speed communication bus providing each embedded processor with a reference torque signal, said embedded processor determining the difference between the reference torque and the actual torque on the spring and controlling the position of the motor shaft so that the reference torque and the actual torque are the same, said embedded processor operating at a higher speed than the remote controller, wherein a servo loop within the embedded processor controls the position of an actuator according to a relation between position and the torque in the spring.

* * * * *